Sept. 7, 1926.  1,598,993
J. W. VLAZNY
CARPENTER'S GAUGE
Filed Nov. 9, 1923
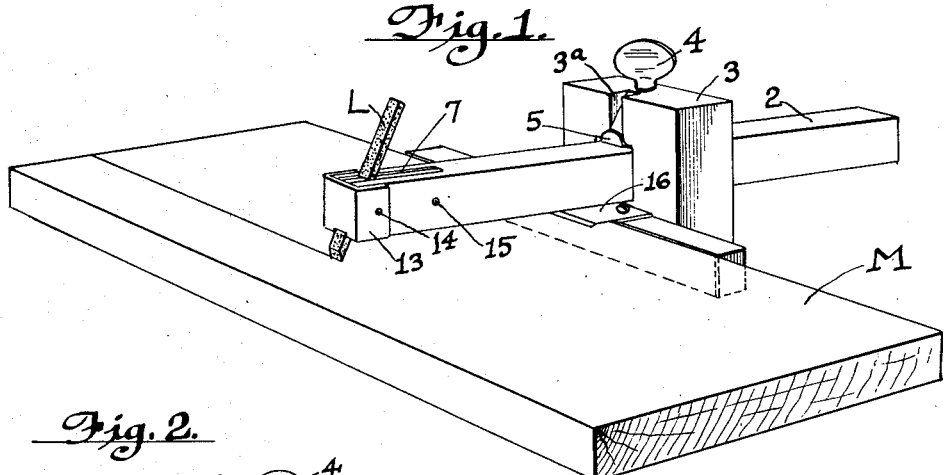
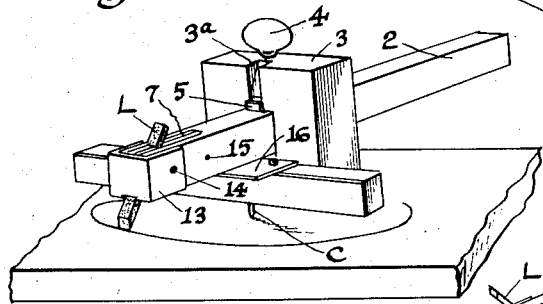
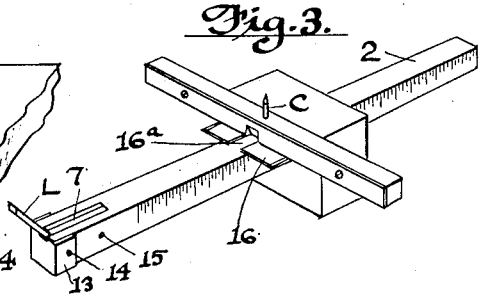
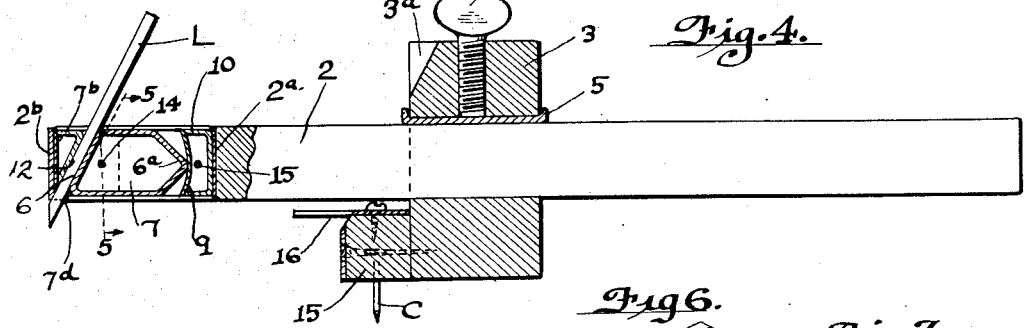
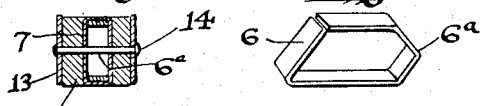
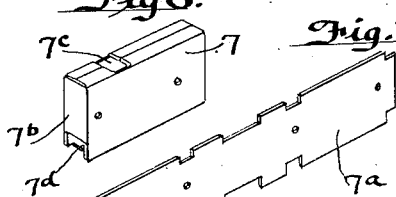
Witness
W H Hall
Inventor.
JOSEPH W. VLAZNY.
by Hazard and Miller
Attorneys.

Patented Sept. 7, 1926.

1,598,993

UNITED STATES PATENT OFFICE.

JOSEPH W. VLAZNY, OF WHITTIER, CALIFORNIA.

CARPENTER'S GAUGE.

Application filed November 9, 1923. Serial No. 673,687.

This invention relates to carpenters' gauges and has for its object to provide an improved lead-holder.

Another object is to provide a lead-holder by which may be utilized leads from pencil stubs and particularly leads of square cross-section such as are commonly used by carpenters.

Another object is to provide a combined adjustable gauge and compass.

Another object is to provide a pencil-clamping means that may be readily applied to gauge bars of standard form and at small expense and without materially changing the construction of the gauge bar.

Another object is to provide a lead-clamp of such construction and design that the lead can be advanced readily as its point is worn, and further an object is to provide for the ready sharpening of the lead as the point is worn.

Other objects and advantages will be made manifest in the following specification of an embodiment of the invention illustrated in the accompanying drawings, wherein:

Fig. 1 is a perspective of the improved gauge as applied.

Fig. 2 is a perspective showing the adaptation of the gauge as a compass.

Fig. 3 is a perspective of the inverted gauge.

Fig. 4 is a side elevation and sectional view.

Fig. 5 is a cross-section on lines 5—5 of Fig. 4.

Fig. 6 is a perspective of shell forming a part of the device.

Fig. 7 is a perspective of a blank of which the shell is formed.

Fig. 8 is a perspective of the movable clamp-jaw of the device.

Fig. 9 is a perspective of the stationary jaw.

Fig. 10 is a perspective of the end-strap.

The present invention consists broadly of means adapted to be combined with the scribing end of a conventional form of carpenter's gauge bar 2, which is adapted to be frictionally locked in the gauge block 3, as by a clamp screw 4, bearing down on a shoe 5, provided in the block cavity through which the bar 2 is slidable.

The device includes means adapted to be inserted or provided in the scribing end of the bar 2, and operative to frictionally grip a piece of pencil lead L, which is here shown as of square cross-section.

The pencil-holding means, as shown, includes a follower or clamp device including an effective gripping face 6. This follower may conveniently be made of a piece of strip metal bent to a generally oblong form to be guided longitudinally in a shell or box 7 which is adapted to be inserted in a slot $2^a$ formed in the scribing end of the bar 2. One end of the follower or clamp member is provided with a projecting part $6^a$ and this is engageable by a spring 9 supported in the shell as by a bolster 10.

The clamp 6 preferably inclines upwardly and rearwardly so as to hold the lead in an inclined position longitudinally as to the axis of the bar 2 and in such position that the effective or scribing end of the lead may lie in the end plane $2^b$ of the bar. The bolster is supported within the shell 7 and this shell is conveniently formed of a blank $7^a$ of thin flat material which is adapted to be folded along its top and bottom edges, as clearly shown in Fig. 6, and it is also transversely folded to form a transverse end wall $7^b$. This shell is adapted to be sunk in the end-slot $2^a$ with the top and bottom edges of the shell substantially flush with the top and bottom surfaces of the bar 2. The shell is provided with notches in its top and bottom flanges to form an upper opening $7^c$ and a lower front end opening $7^d$ for the reception of the lead L, disposed within the shell. At its forward end is an abutment member 12 having an inclined wall parallel to the clamping face 6 of the follower, so that the pencil lead is firmly but adjustably gripped between the follower and the abutment.

A reenforcing strap 13 of substantially U-shaped form is laid around the scribing end of the bar and is fastened by a rivet or pin 14 which also passes through the closed shell 7 and secures these parts in place. Another rivet 15 passes through the gauge bar 2 at the other end of the shell 7 also holding the shell in position.

Since the lead L projects obliquely through the bar in such a location as to intersect the end plane $2^b$ of the bar, it will be seen that by sufficiently projecting the lead as in Fig. 4, that the lead can be readily sharpened by resting the end $2^b$ of the bar upon a suitable support and by reciprocating the bar on its end face, the projected end of the lead L will thus be sharpened to the desired point. After this a slight pressure on the lead in a longitudinal direction thereof will push the lead to a desired degree, as is shown in Figs. 1 and 2, to enable the same to be applied.

A further feature of the invention consists of providing means enabling the use of an automatic carpenter's gauge of the type shown, as a compass. To that end, there is shown as attached to the gauge block a center or compass-point C. This point is shown as mounted in a cross-strip 15 attached to one end-face of the sliding block 3. This cross strip is also illustrated as having a guide plate 16 projecting forwardly from the strip 15 and being applicable to the corner of a board, plank or other piece of material M, being marked. The plate 16 is shown as being slotted at 16ª to provide clearance for the lead L when the gauge bar 2 is retracted to a position close up to the block 3; this latter being notched at 3ª to clear the lead. When the bar 2 is retracted, the lead L will be protected when lying in the apertures 16ª and 3ª.

From the above it will be seen that the device is of simple character and can be readily installed or manufactured in standard carpenters' gauges and enables the utilization of the stubs of square lead pencils as generally used by carpenters. It will further be seen that the invention provides for the conversion of a gauge into an implement for drawing circles up to the limit of adjustment of the bar in the block.

Further embodiments, modifications and variations may be resorted to within the spirit of the invention.

What is claimed is:

1. A carpenter's gauge comprising a bar having a slot on one end, means for yieldingly clamping a section of pencil lead upon the bar including a box-like shell disposed within the slot in the bar, means providing an abutment in one end of the shell, a follower disposed within the shell and opposed to the abutment, and spring means for urging the follower toward said abutment whereby the pencil lead may be clamped therebetween.

2. A carpenter's gauge comprising a bar having a slot on one end, means for yieldingly clamping a section of pencil lead upon the bar including a box-like shell disposed within the slot in the bar, means providing an abutment in one end of the shell, a follower disposed within the shell and opposed to the abutment, and spring means for urging the follower toward said abutment whereby the pencil lead may be clamped therebetween, the effective clamping faces of the abutment and follower being parallel and oblique to the axis of the bar, so that the projected lead will intersect the plane of the adjacent end of the bar.

In testimony whereof I have signed my name to this specification.

JOSEPH W. VLAZNY.